(12) United States Patent
Mannsperger et al.

(10) Patent No.: US 12,351,159 B2
(45) Date of Patent: Jul. 8, 2025

(54) METHOD FOR ACTIVELY CHANGING THE FRICTIONAL VALUE OF A HYBRID DISCONNECT CLUTCH INSTALLED IN A POWER TRAIN OF A VEHICLE

(71) Applicant: Schaeffler Technologies AG & Co. KG, Herzogenaurach (DE)

(72) Inventors: Ralf Mannsperger, Renchen (DE); Timo Enders, Bensheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 375 days.

(21) Appl. No.: 17/435,151

(22) PCT Filed: Jan. 27, 2020

(86) PCT No.: PCT/DE2020/100048
§ 371 (c)(1),
(2) Date: Aug. 31, 2021

(87) PCT Pub. No.: WO2020/177803
PCT Pub. Date: Sep. 10, 2020

(65) Prior Publication Data
US 2022/0135020 A1 May 5, 2022

(30) Foreign Application Priority Data
Mar. 6, 2019 (DE) .................. 10 2019 105 604.7

(51) Int. Cl.
*B60W 20/40* (2016.01)
*B60W 10/02* (2006.01)
(Continued)

(52) U.S. Cl.
CPC .......... *B60W 20/40* (2013.01); *B60W 10/023* (2013.01); *B60W 2510/0275* (2013.01);
(Continued)

(58) Field of Classification Search
CPC .............. B60W 20/40; B60W 10/023; B60W 2510/0275; B60W 2710/025;
(Continued)

(56) References Cited

U.S. PATENT DOCUMENTS 8,899,397 B2 * 12/2014 Ito ........................... F16D 48/02
192/85.25
9,803,703 B2 * 10/2017 Hodrus ................... F16D 48/06
(Continued)

FOREIGN PATENT DOCUMENTS

| CN | 105452078 A | * | 3/2016 | ............... B60K 6/20 |
| CN | 106662176 A | * | 5/2017 | ............. F16D 48/06 |

(Continued)

OTHER PUBLICATIONS

"Stock Drive Products multiplate designed slip clutches", Aug. 5, 2013.*

(Continued)

*Primary Examiner* — Cuong H Nguyen
(74) *Attorney, Agent, or Firm* — Volpe Koenig

(57) ABSTRACT

A method actively changes the frictional value of a hybrid disconnect clutch installed in a powertrain of a vehicle in which a first electric motor (18) is connected to a clutch input (21) and an internal combustion engine (17), and a second electric motor (19) is connected to a clutch output (22) and a vehicle output (23). The frictional value of the hybrid disconnect clutch is actively changed, in order to roughen a surface of the friction linings on the hybrid disconnect clutch (20). A slip situation is established at the hybrid disconnect clutch (20), and during this slip situation energy is introduced into the hybrid disconnect clutch (20) in a controlled manner.

11 Claims, 4 Drawing Sheets

(51) Int. Cl.
*G01C 21/00* (2006.01)
*F16D 48/06* (2006.01)
*G06F 16/29* (2019.01)

(52) U.S. Cl.
CPC .............. *B60W 2510/0657* (2013.01); *B60W 2510/081* (2013.01); *B60W 2710/025* (2013.01); *F16D 48/06* (2013.01); *G06F 16/29* (2019.01)

(58) Field of Classification Search
CPC .... B60W 2510/0657; B60W 2510/081; Y02T 10/62; F16D 2500/1026; F16D 2500/30406; F16D 2500/1066; F16D 2500/7041; F16D 2500/502; F16D 2500/30402; F16D 2500/10406; F16D 48/064
USPC .................. 701/22; 180/65.275; 903/946
See application file for complete search history.

(56) References Cited

U.S. PATENT DOCUMENTS

| | | | | |
|---|---|---|---|---|
| 11,987,231 | B2 * | 5/2024 | Mannsperger | ........ B60W 10/06 |
| 2004/0157704 | A1 | 8/2004 | Stork et al. | |
| 2009/0111899 | A1 | 4/2009 | Mauldin | |
| 2012/0210411 | A1 | 8/2012 | Bauchot et al. | |
| 2014/0083811 | A1 * | 3/2014 | Ito | ............ F16D 48/02 192/85.63 |
| 2016/0075321 | A1 * | 3/2016 | Hodrus | ............ F16D 48/08 903/946 |
| 2016/0101769 | A1 * | 4/2016 | Gibson | ............ F16D 48/06 180/65.25 |
| 2017/0166201 | A1 * | 6/2017 | Kim | ........ B60W 20/40 |
| 2019/0232941 | A1 * | 8/2019 | Wang | ........ B60W 40/12 |

FOREIGN PATENT DOCUMENTS

| | | | | |
|---|---|---|---|---|
| CN | 110056583 | B * | 12/2020 | ............ F16D 48/06 |
| DE | 10204981 | A1 | 8/2003 | |
| DE | 102008027071 | A1 | 1/2009 | |
| DE | 102012204929 | A1 | 10/2012 | |
| DE | 102012207825 | A1 | 12/2012 | |
| DE | 102015215905 | A1 * | 3/2016 | ............ B60K 6/48 |
| DE | 102015218691 | A1 | 4/2016 | |
| DE | 102015208849 | A1 | 11/2016 | |
| DE | 102015216071 | A1 | 3/2017 | |
| DE | 102016215855 | A1 * | 3/2017 | ............ B60K 6/48 |
| DE | 102015225215 | A1 * | 6/2017 | ............ B60K 6/48 |
| DE | 102018107979 | A1 | 8/2019 | |
| DE | 102019128070 | A1 | 4/2020 | |
| DE | 102018128961 | A1 | 5/2020 | |
| JP | 2014-61832 | A | 4/2014 | |
| JP | 2014061832 | A * | 4/2014 | ............ F16D 25/14 |
| JP | 6089533 | B2 * | 3/2017 | ............ F16D 25/14 |
| KR | 20210135221 | A * | 11/2020 | ............ B60W 20/40 |
| WO | WO-2016008463 | A1 * | 1/2016 | ............ F16D 48/06 |
| WO | WO-2016141940 | A1 * | 9/2016 | ............ F16D 48/06 |
| WO | WO-2017140298 | A1 * | 8/2017 | ............ F16D 31/08 |
| WO | WO-2020177803 | A1 * | 9/2020 | ........ B60W 10/023 |

OTHER PUBLICATIONS

"Precision Mechanical Slip Clutches" brochure.*
CN105452078A by Hata et al—Control system for hybrid vehicle (an English-translation version—Mar. 30, 2016).*
Dong, Peng, et al. "Coordinated clutch slip control for the engine start of vehicles with P2-hybrid automatic transmissions." Mechanism and Machine Theory 153 (2020): 103899. (Year: 2020).*
Xu, Xiangyang, et al. "Optimized control of engine start assisted by the disconnect clutch in a P2 hybrid automatic transmission." Mechanical Systems and Signal Processing 124 : 313-329 (Year: 2019).*
Hu, Donghai, et al. "Dynamic characteristic analysis for clutch engagement process of series-parallel hybrid electric vehicle." Nonlinear Dynamics 105.1 (2021): 45-59.(Year: 2021).*
An English-translated version of JP-2014061832-A (Aisin Seiki Co Ltd) (Year: 2014).*
Dong, Peng, et al. "Coordinated clutch slip control for the engine start of vehicles with P2-hybrid automatic transmissions." Mechanism and Machine Theory 153 (Year: 2020): 103899.*
Hu, Donghai, et al. "Dynamic characteristic analysis for clutch engagement process of series-parallel hybrid electric vehicle." Nonlinear Dynamics 105.1 (Year: 2021): 45-59.*
De Castro, Ricardo Jorge Pinto. Motion control and energy management of electric vehicles. Diss. Universidade do Porto (Portugal), (Year: 2013).*
Author: Timo Enders, Unpublished German Application No. 102018128959.6, Verfahren zur Ermittlung einer Kupplungskenngröße durch einen Elektromotor, Date: Nov. 19, 2018, Country: Germany.
Notice of Preliminary Rejection for Corresponding Korean Patent Application No. 10-2021-7024958 dated Nov. 18, 2024.

* cited by examiner

METHOD FOR ACTIVELY CHANGING THE FRICTIONAL VALUE OF A HYBRID DISCONNECT CLUTCH INSTALLED IN A POWER TRAIN OF A VEHICLE

CROSS-REFERENCE TO RELATED APPLICATIONS

This application is the U.S. National Phase of PCT Appln. No. PCT/DE2020/100048 filed Jan. 27, 2020, which claims priority to DE 102019105604.7 filed Mar. 6, 2019, the entire disclosures of which are incorporated by reference herein.

TECHNICAL FIELD

The disclosure relates to a method for actively changing the frictional value of a hybrid disconnect clutch installed in a powertrain of a vehicle in which a first electric motor is connected to a clutch input and an internal combustion engine, and a second electric motor is connected to a clutch output and a vehicle output.

BACKGROUND

From DE 102018128961, filed by the applicant, a method for determining a clutch parameter of a disconnect clutch in a powertrain of a vehicle is known. The powertrain comprises a first electric motor, a second electric motor and an internal combustion engine, wherein the first electric motor is connected to a clutch input and an internal combustion engine, and the second electric motor is connected to a clutch output and a vehicle output. A frictional value is adapted as a characteristic of the clutch by actuating the clutch in order to assume a slipping state and thereby setting a predetermined speed difference between a first and a second speed, wherein the clutch input torque applied to the clutch input is determined and the transmission torque is determined depending on the clutch input torque.

In systems in which a parking lock and a hybrid disconnect clutch are actuated in a common hydraulic circuit and a cooling medium is pumped in the transmission, an electrically operated reversing pump takes on the task of circulating a hydraulic medium in the hydraulic circuit. The cooling medium is pumped through the cooling circuit in one direction of rotation of the reversing pump, while the pressure required to actuate the hybrid disconnect clutch or parking lock is made available in the other direction of rotation.

In such a system, the frictional power at the hybrid disconnect clutch is too low for the setting of a stable frictional value on the friction surfaces of the lining of the hybrid disconnect clutch. Physically, due to the low frictional power, the lining of the hybrid disconnect clutch is ground smooth, which slowly decreases the frictional value.

SUMMARY

It is desirable to specify a method for actively changing the frictional value of a hybrid disconnect clutch installed in a powertrain of a vehicle, in which a stable frictional value is set on the friction surfaces of the clutch lining.

In order to roughen a surface of the friction linings on the hybrid disconnect clutch which produces a force flow only from the internal combustion engine to the vehicle output and is actuated via a pump in a common hydraulic circuit containing at least one further consumer, a slip situation is established at the hybrid disconnect clutch, and during this slip situation energy is introduced into the hybrid disconnect clutch in a controlled manner. This has the advantage that the roughening of the friction linings increases the frictional value on the linings of the hybrid disconnect clutch. An active change in the frictional value can thus also be set on such a hybrid disconnect clutch, which does not have to compensate for any differences in speed, but only has to produce the power flow from the internal combustion engine to the output of the vehicle.

The hybrid disconnect clutch is advantageously opened completely without interruption before the slip situation is set to roughen the surface of the friction linings of the hybrid disconnect clutch and then closed to a predetermined torque capacity, which is below the maximum possible electric motor torque. This setting makes it possible to reliably regulate the slip speed with the aid of the electric motors. The first electric motor has to provide a torque above the clutch torque in order to put it into slip.

In a further embodiment, the hybrid disconnect clutch is opened without interruption in one step or continuously. This allows a reliable interruption of the torque of the internal combustion engine.

The slip situation and the controlled input of energy are advantageously set when a maximum clutch torque transmitted by the hybrid disconnect clutch is below a maximum torque of the internal combustion engine. Assuming that the torque specified by the internal combustion engine is no longer transmitted by the hybrid disconnect clutch, a reliable conclusion is given that the frictional value of the hybrid disconnect clutch is too low. Since normal use of the clutch does not provide for these higher friction losses, which would roughen the lining again, this change in the frictional value is artificially produced by a specific software function.

In one embodiment, a difference between the speeds of the first and the second electric motor is monitored to check that the maximum torque of the internal combustion engine is not reached by the maximum transmitted clutch torque of the hybrid disconnect clutch, the slip situation being set with the controlled energy input if the difference is greater than itself when the maximum clutch torque of the hybrid disconnect clutch is transmitted, the resulting slip speed of the hybrid disconnect clutch. This reliably recognizes that the hybrid disconnect clutch is no longer transmitting the torque of the internal combustion engine.

In one variant, a slip speed control is activated with the first and the second electric motor. By means of this slip speed control, the energy input into the linings of the hybrid disconnect clutch is ensured.

In one embodiment, the second electric motor specifies the target speed for the first electric motor for the slip speed control. It is thus possible to set such a slip speed at the clutch input and at the clutch output that enables a high energy input.

In a further embodiment, the target speed is specified by the second electric motor by subtracting an offset from the speed of the second electric motor. In this situation, the friction on the linings of the hybrid disconnect clutch causes them to be roughened and the frictional value to increase again.

In a further development, the setting of the slip situation on the hybrid disconnect clutch for the controlled input of energy into the hybrid disconnect clutch is ended when a predefined energy input threshold value is reached. From this point, the hybrid disconnect clutch is able to transmit the full torque of the internal combustion engine.

BRIEF DESCRIPTION OF THE DRAWINGS

An embodiment will be explained in detail with reference to the figures shown in the drawing.

In the figures.

DETAILED DESCRIPTION

Figure 1:
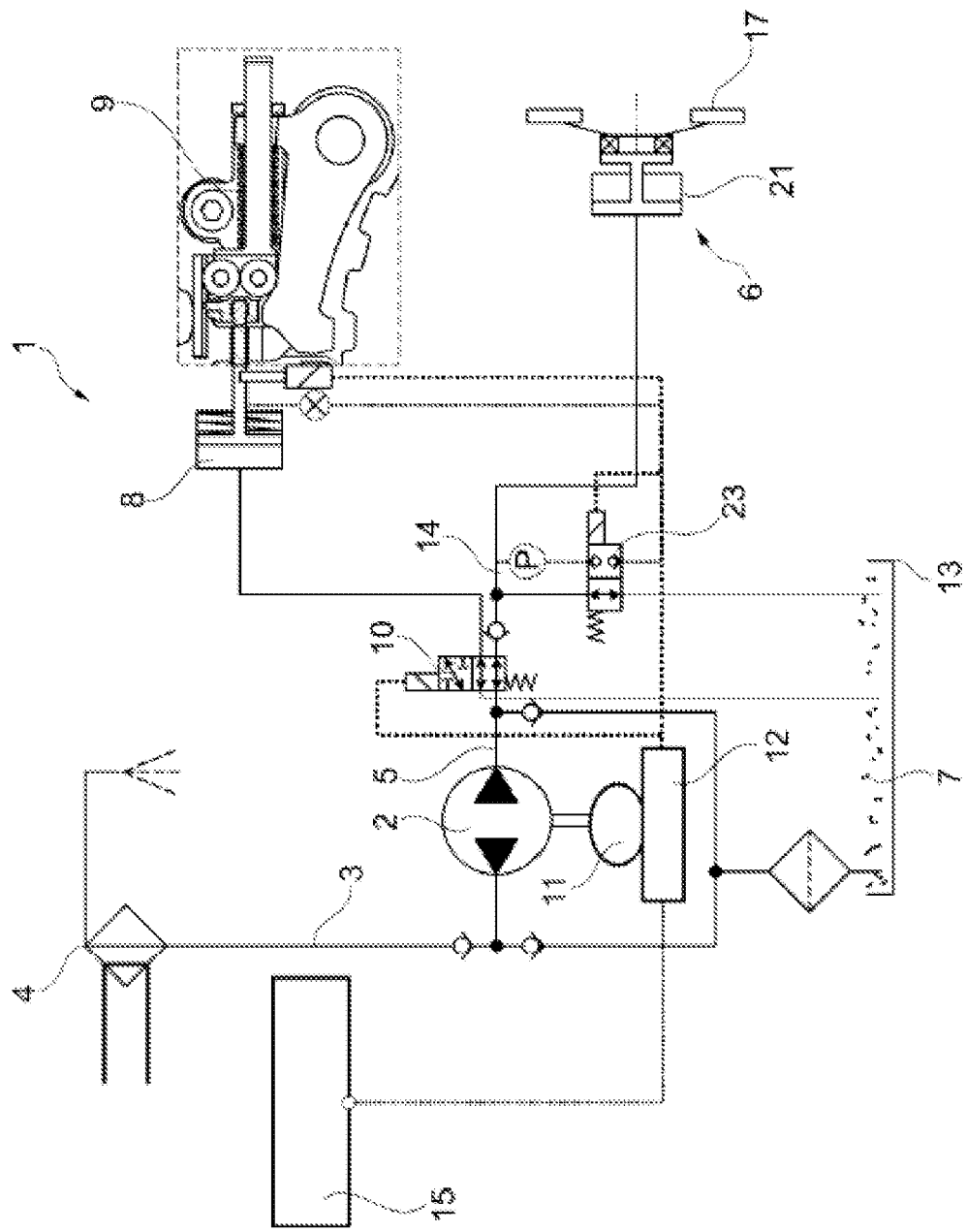
FIG. 1 shows a schematic diagram of a hydraulic device for carrying out the method.

FIG. 1 shows a schematic diagram of a hydraulic device for carrying out the method. The hydraulic device 1 comprises a pump 2 which is connected to a coolant line 3 on one side. The coolant line 3 feeds a hydraulic medium 7, for example oil, to a first consumer 4 in the form of a heat exchanger. The hydraulic medium 7 is fed to this first consumer 4 for the purpose of cooling or lubrication.

Figure 2:
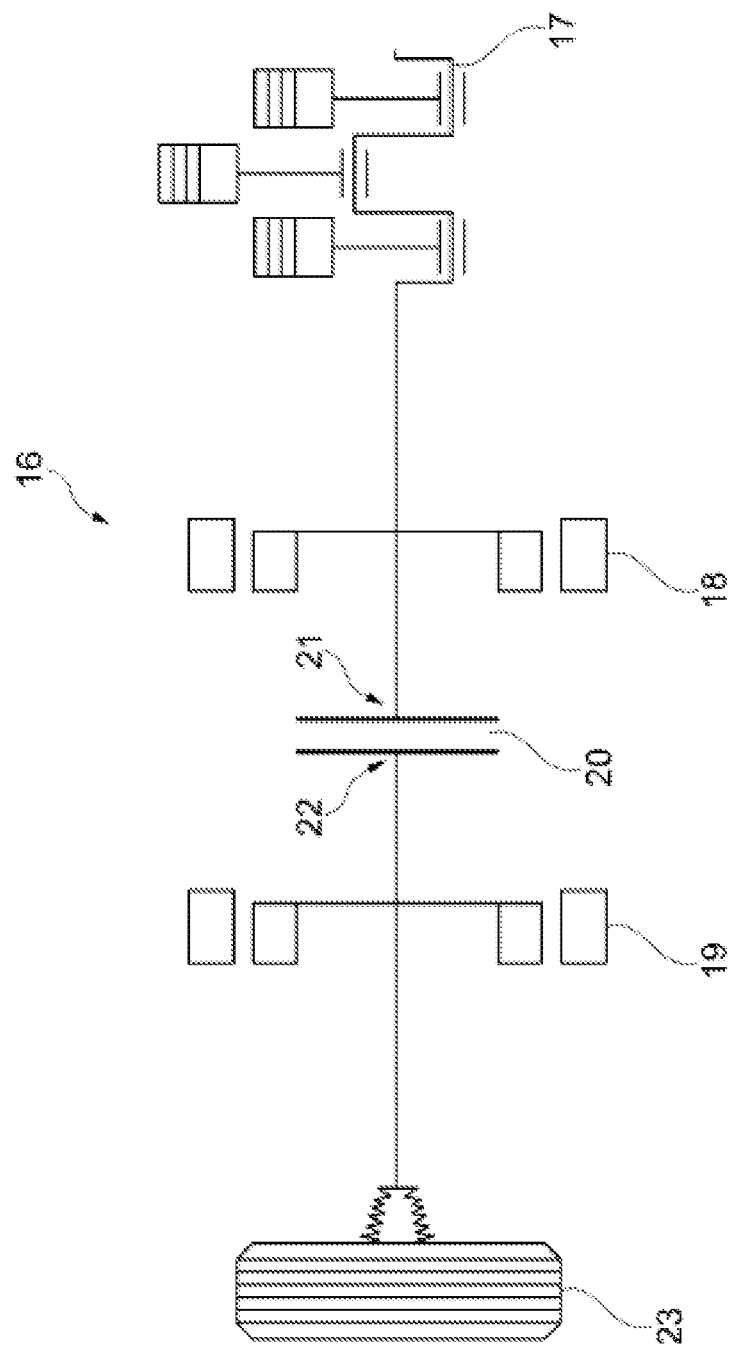
FIG. 2 shows a schematic diagram of a hybrid drive for interaction with the hydraulic device according to FIG. 1.

On the other side, the pump 2 is connected to an actuation line 5. The actuation line 5 is provided to feed the hydraulic medium 7 to a second consumer 6, which is designed as a clutch slave cylinder 21, which is in an operative connection with a hybrid disconnect clutch 20 of a hybrid drive system 16 (FIG. 2). Basically, the same hydraulic medium is contained in both lines, such as the coolant line 3 and the actuation line 5. A parking lock actuator 8, which acts on a parking lock 9, is connected to the actuation line 5 as a further consumer. A switching valve 10 is integrated into the coolant line 3 and/or the actuation line 5 in such a way that the hydraulic medium 7 can be fed to the parking lock actuator 8 in a targeted manner.

The pump 2 is designed as an electrically driven reversing pump, which enables a first conveying direction in order to supply the hydraulic medium 7 as required to the cooling/lubricating task, the pump 2 supplying the hydraulic medium 7 in a second conveying direction to one or more actuation functions, which in this example correspond to the clutch and/or parking lock function. The pump 2 is driven by an electric motor 11 which is activated by a control unit 12. The pump 2, the electric motor 11 and the control unit 12 form an electric pump actuator. A type of transmission sump is used as the hydraulic fluid source 13 for all consumers 4, 6, 8. In the actuation line 5, a pressure sensor 14 is arranged, which is connected to the control unit 12 of the pump and via this to power electronics that control the entire drive unit.

FIG. 2 shows a schematic diagram of a hybrid drive system 16 which comprises an internal combustion engine 17 and two electric motors 18, 19. The two electric motors 18, 19 can be coupled via the hybrid disconnect clutch 20. On the input side of the hybrid disconnect clutch 20, the internal combustion engine 17 is rigidly connected to the first electric motor 18, which works as a generator and, if necessary, provides energy for the second electric motor 19, which drives a vehicle with the hybrid drive system 16 during the electric journey. The second electric motor 19 is positioned on the output side of the hybrid disconnect clutch 20 and is coupled to the output 23 of the hybrid vehicle. Such a hybrid disconnect clutch 20 can be closed step by step due to the pump actuation, but can only be opened completely in one step. In this constellation, the hybrid disconnect clutch 20 does not have to compensate for any differences in speed, since only a power flow from the internal combustion engine 17 to the output 23 has to be established. Since the normal use of the hybrid disconnect clutch 20 does not provide for higher frictional power, which would roughen the lining again, this has to be done artificially using a special software function.

Figure 3:
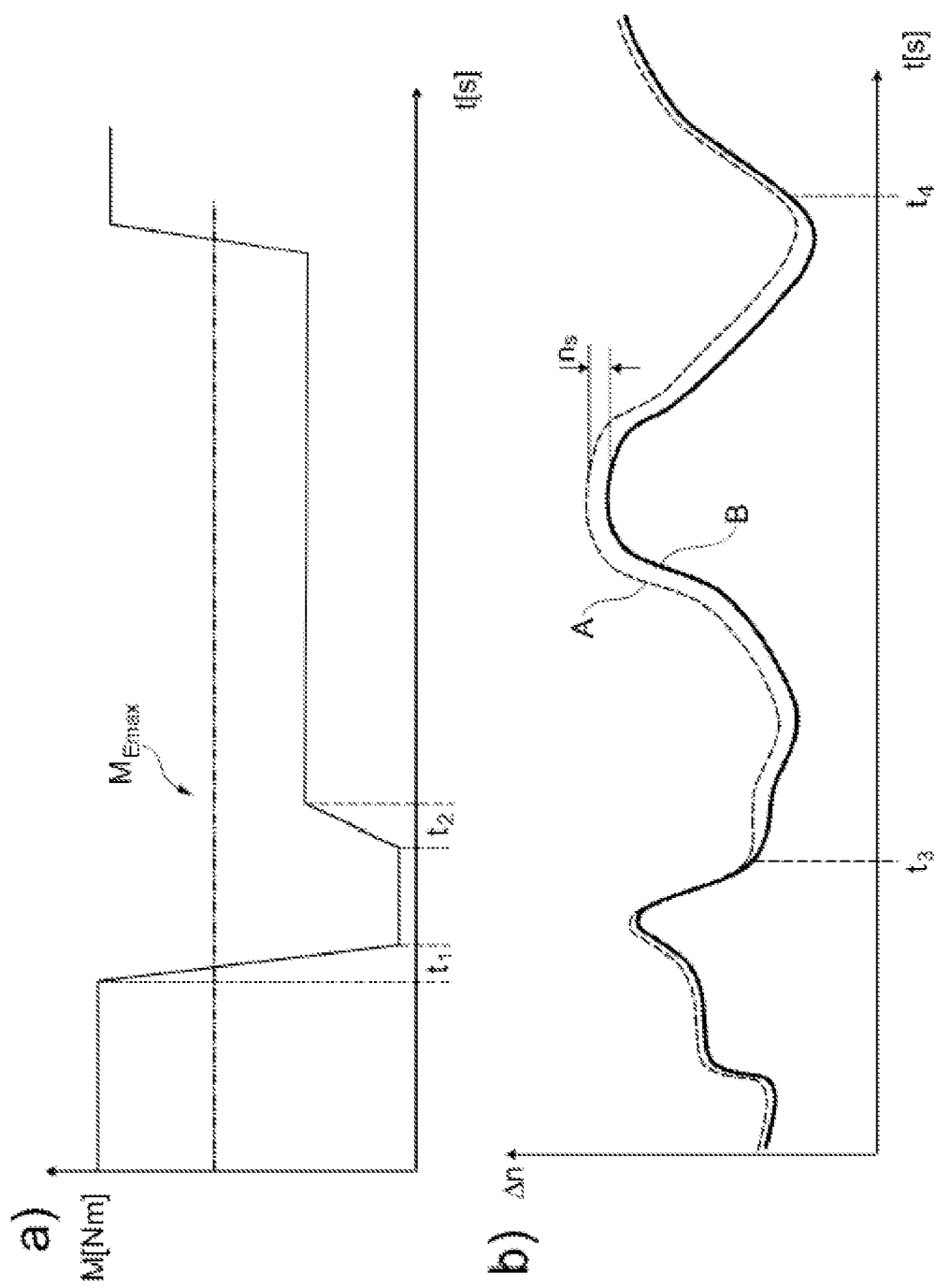
FIG. 3 shows an exemplary embodiment of the method.

FIG. 3 shows an exemplary embodiment of the method. FIG. 3a shows the clutch torque M over time t, while FIG. 3b shows the difference $\Delta n$ between the speed of the second electric motor 19 and the internal combustion engine 17/first electric motor 18 over time t. The maximum transferable clutch torque M of the hybrid disconnect clutch 20 is continuously monitored. If this maximum transferable clutch torque M of the hybrid disconnect clutch 20 falls below the maximum torque of the internal combustion engine 17, a slip situation is activated.

Before this slip situation is set, the hybrid disconnect clutch 20 is completely opened without interruption at time $t_1$. At time $t_2$, the hybrid disconnect clutch 20 is closed to a clutch torque M below a maximum electric motor torque $M_{Emax}$. As a result of this setting of the hybrid disconnect clutch 20, as shown in FIG. 3b, a slip speed $n_S$ between clutch input 21 and clutch output 22, i.e., the electric motors 1 and 2, is set and regulated at time $t_3$. During this slip speed $n_S$, a predetermined amount of energy is introduced into the friction linings of the hybrid disconnect clutch 20, as a result of which they are roughened. If an energy input threshold value $E_S$ is reached by the energy input $E_{Sch}$ in the friction linings, the slip speed $n_S$ is reduced (time $t_4$). This is shown in FIG. 3b, where the curve A shows the speed $n_V$ of the internal combustion engine 17, while the curve B shows the speed $n_{E2}$ of the second electric motor 19.

Figure 4:
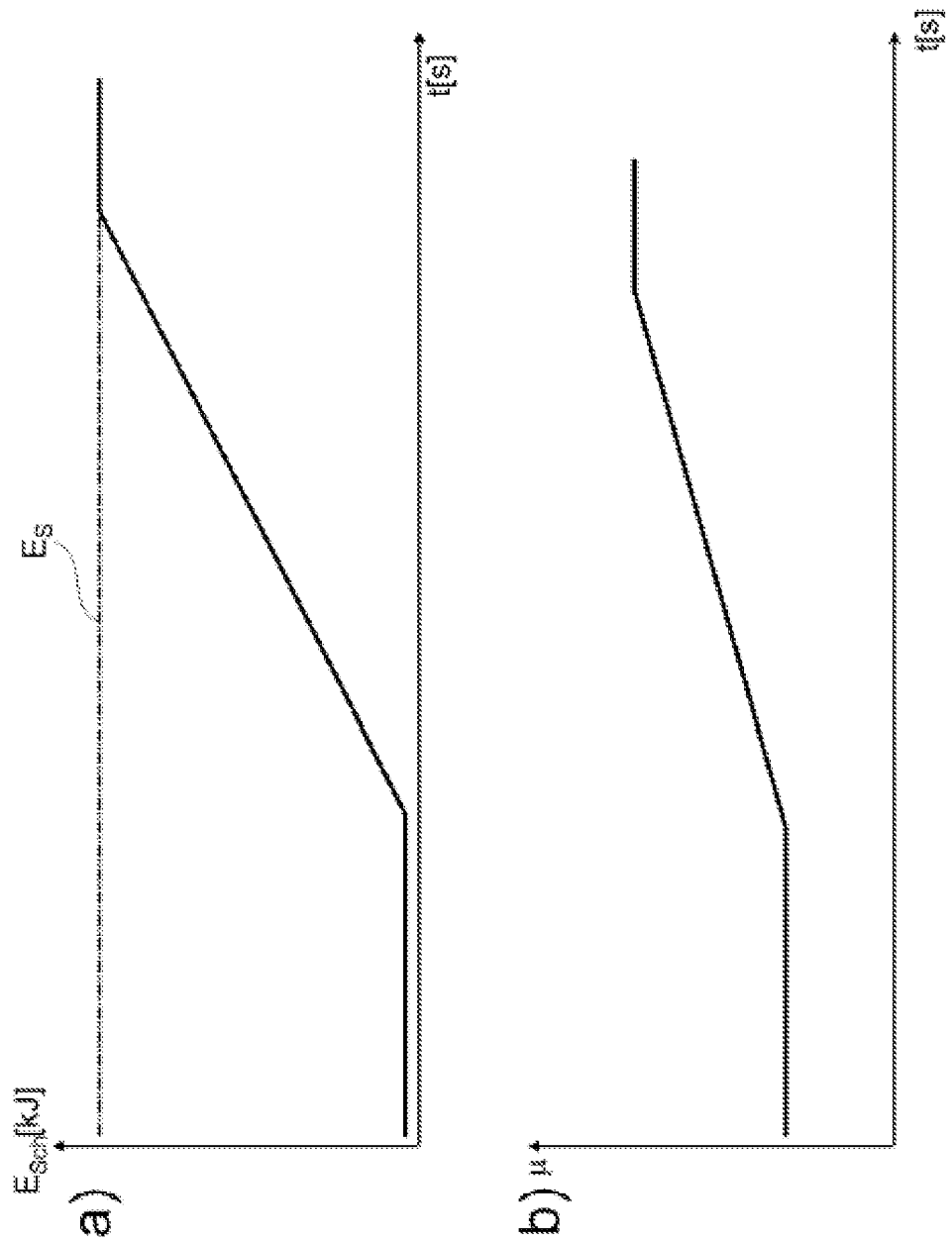
FIG. 4 shows a schematic diagram of the change in the frictional value setting according to the method.

As can be seen from FIG. 4, where FIG. 4a shows the energy input $E_{Sch}$ over time t and FIG. 4b shows the frictional value $\mu$ of the clutch linings of the hybrid disconnect clutch 20 over time t, the frictional value $\mu$ for the clutch linings also increases with the energy input $E_{Sch}$ during the slip situation in the hybrid disconnect clutch 20. The maximum clutch torque M of the hybrid disconnect clutch 20 can be achieved again after the increase in the frictional value $\mu$ if a predetermined amount $E_S$ of energy is introduced into the linings of the hybrid disconnect clutch 20. As a result, the maximum torque of the internal combustion engine 17 can be transmitted again.

LIST OF REFERENCE SYMBOLS

1 Hydraulic device
2 Pump
3 Coolant line
4 Consumer
5 Actuation line
6 Consumer
7 Hydraulic medium
8 Parking lock actuator
9 Parking lock
10 Switching valve
11 Electric motor
12 Control unit
13 Hydraulic fluid source
14 Pressure Sensor
15 Power electronics
16 Hybrid powertrain system
17 Internal combustion engine
18 Electric motor
19 Electric motor
20 Hybrid disconnect clutch
21 Clutch input
22 Clutch output
23 Output
M Clutch torque
$M_V$ Torque of the internal combustion engine
$M_{Emax}$=Maximum torque of an electric motor Δn Speed difference
$n_S$ Slip speed
$E_{Sch}$ Energy input
$E_S$ Energy input threshold
μ Frictional value
t Time

The invention claimed is:

1. A method for actively changing a frictional value of a hybrid disconnect clutch installed in a powertrain of a vehicle, the method comprising:
providing a first electric motor connected to a clutch input and an internal combustion engine,
providing a second electric motor connected to a clutch output and a vehicle output, and
roughening a surface of the friction linings on the hybrid disconnect clutch by establishing a controlled slip at the hybrid disconnect clutch, wherein during the controlled slip, more energy is introduced into the hybrid disconnect clutch to increase the frictional value of the friction linings, and
wherein the controlled slip on the hybrid disconnect clutch for controlled energy input into the hybrid disconnect clutch ends in response to a predetermined energy input threshold value being reached.

2. The method according to claim 1, wherein the hybrid disconnect clutch is opened completely without interruption before the controlled slip is established, and then the hybrid disconnect clutch is closed to a predetermined torque capacity to roughen a surface of friction linings of the hybrid disconnect clutch.

3. The method according to claim 2, wherein the hybrid disconnect clutch is opened without interruption in a single step.

4. The method according to claim 1, wherein the controlled slip and the controlled input of energy take place in response to a maximum clutch torque capacity of the hybrid disconnect clutch being less than a maximum torque of the internal combustion engine.

5. The method according to claim 4, further comprising determining that the maximum torque of the internal combustion engine exceeds the maximum clutch torque capacity of the hybrid disconnect clutch by monitoring a difference between speeds of the first and second electric motors, wherein the controlled slip is set with the controlled energy input when the difference is greater than a slip speed threshold.

6. The method according to claim 1, wherein a slip speed control is activated with the first and the second electric motor.

7. The method according to claim 6, wherein a speed of the second electric motor determines a target speed for the first electric motor for the slip speed control.

8. The method according to claim 6, wherein the target speed is determined by subtracting an offset from the speed of the second electric motor.

9. A method for actively changing the frictional value of a hybrid disconnect clutch, the method comprising:
in response to measured torque capacity being less than a maximum engine torque, initiating a controlled slip by setting a speed of a first motor based on a speed of a second motor, the first motor being driveably connected to vehicle wheels and the second motor being drivably connected to an engine;
during the controlled slip, introducing a predetermined amount of energy into the hybrid disconnect clutch to roughen a surface of a friction lining to increase the frictional value of the friction lining, wherein the controlled slip and the controlled input of energy take place in response to a maximum clutch torque capacity of the hybrid disconnect clutch being less than a maximum torque of the internal combustion engine, and
determining that the maximum torque of the internal combustion engine exceeds the maximum clutch torque capacity of the hybrid disconnect clutch by monitoring a difference between speeds of the first and second electric motors, wherein the controlled slip is set with the controlled energy input when the difference is greater than a slip speed threshold.

10. The method of claim 1 wherein the hybrid disconnect clutch is actuated via a pump in a common hydraulic circuit containing at least one further consumer.

11. The method of claim 9 wherein the hybrid disconnect clutch is actuated via a pump in a common hydraulic circuit containing at least one further consumer.

* * * * *